July 15, 1952 C. A. LOVELL ET AL 2,603,718

IMPULSE-SENDER

Filed Jan. 20, 1950 3 Sheets-Sheet 1

INVENTORS: C. A. LOVELL
D. B. PARKINSON

BY William F. Simpson.

ATTORNEY

INVENTORS: C. A. LOVELL
D. B. PARKINSON

BY William F. Simpson
ATTORNEY

INVENTORS C.A.LOVELL
D.B. PARKINSON
BY William F. Simpson.
ATTORNEY

Patented July 15, 1952 2,603,718

UNITED STATES PATENT OFFICE 2,603,718

IMPULSE-SENDER

Clarence A. Lovell, Summit, N. J., and David B. Parkinson, Cleveland Heights, Ohio, assignors to Bell Telephone Laboratories, Incorporated, New York, N. Y., a corporation of New York Application January 20, 1950, Serial No. 139,558

2 Claims. (Cl. 179—90)

This invention relates to telephone calling or signaling circuits, apparatus and methods and more particularly to telephone calling methods, circuits and apparatus of the preset type which generates pulses of electric current for transmission over voice frequency telephone channels to control automatic switching equipment for establishing communication paths between calling subscriber and called subscribers.

More particularly, this invention relates to improvements in telephone signaling methods, circuits and equipment of the type set forth in a patent application of Lovell and Parkinson, Serial No. 35,927 filed June 29, 1948 which issued as Patent 2,588,397 on March 11, 1952.

The system disclosed in that application employed a motor mechanism at a subscriber's station which was actuated by power transmitted over the subscriber's line. The power transmitted over the subscriber's line was also used to charge a condenser which condenser was discharged under control of contacts controlled by the motor.

An object of the present invention is to provide improved and simplified signaling methods, circuits and apparatus at a telephone subscriber's station for transmitting similar types of signaling pulses in which the motor mechanism is not required thus eliminating the cost and maintenance of such a motor mechanism.

In the above-identified application of Lovell and Parkinson, the subscriber station is provided with a group of manually controlled switches or dials which the subscriber sets in accordance with the number or station designation of the called subscriber. These finger wheels are interconnected between two motor-driven distributors, one operating at relatively low speed to select the particular number wheel or digit, and the other operating at relatively higher speed for generating pulses representing the digit to be transmitted. These distributors complete circuits for discharging a condenser, that is, for abruptly changing the charge or potential condition of a condenser. The discharge or abrupt change in the potential condition of the condenser is employed to transmit a pulse over the subscriber's line extending from the station. The series of pulses representing a complete subscriber's designation is repeated over and over again as long as power is applied to the driving motor.

In that application, the calling apparatus generated pulses in which the magnitude of each of the digits or identity of the signals comprising the called station designation is represented by the time elapsing between a reference or start pulse and the stop or digit pulse. The pulse generating equipment is arranged to generate two pulses for each digit of a called subscriber's designation, the first pulse is usually called the start pulse and the second pulse a stop pulse. The two pulses representing one digit are followed by two pulses representing the succeeding digits and so on. The pulses representing a complete subscriber's designation are spaced from other pulses representing another repetition of the same subscriber's designation by means of a blank spacing interval during which no pulses are transmitted. This blank or spacing interval is longer than the interval between any of the pulses representing any of the digits, numbers or other information represented by the pulses.

In transmitting pulses of short duration over voice frequency transmission paths, difficulty is frequently encountered due to transients set up by the pulses. The transients are usually decaying alternating currents which are caused by resonance circuits employed in telephone transmission paths, repeat coils, filters and other transmission equipment. Transients resulting from the application of short pulses to such equipment persist for a number of cycles and thus for an appreciable interval of time after the exciting pulse has terminated. In accordance with the present invention, the transmitting apparatus is arranged to space the signaling pulses transmitted so that ample time is allowed for the transients associated with or appearing incident to the application of each of the signaling pulses to the signaling or transmission system to die out sufficiently so that this transient will not interfere with the next signaling pulse.

The manner in which the apparatus in accordance with the present invention may be incorporated in a complete telephone system is disclosed in a copending application of W. A. Malthaner, Serial No. 35,925, filed June 29, 1948. Suitable types of equipment for responding to the signaling pulses transmitted from apparatus disclosed herein are disclosed in the copending applications of Vaughan, Serial No. 35,911, filed June 29, 1948; Malthaner, Newby and Vaughan, Serial No. 68,234, filed December 30, 1948.

Novel features disclosed but not claimed herein are claimed in different ones of the above-identified patent applications or in the patent application of D. B. Parkinson, Serial No. 39,015, filed July 16, 1948 which issued as Patent 2,499,606 on March 7, 1950.

In accordance with an exemplary embodiment of the present invention, signaling pulses are generated by discharging a condenser through the primary winding of the transformer. The secondary windings of a transformer are connected across a telephone line so that the signaling pulses are impressed directly across the line.

A slow-speed distributor mechanism is provided which is driven by a stepping mechanism which makes one step in response to each half cycle of an applied alternating current.

In addition, a high-speed distributor mechanism is provided wherein an applied alternating current is employed to produce in effect a rotating magnetic field. A plurality of so-called "reed" relays or contact elements are supported in an electromagnetic field so as to be closed during different portions of each half cycle actuating power applied to the system.

The foregoing and other objects and features of the invention will be apparent from the following description and appended claims when read with reference to the drawings, in which:

Figure 1:
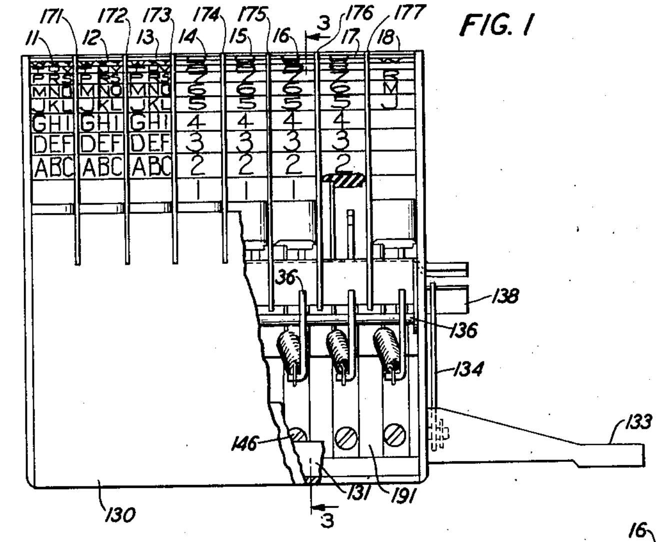
Fig. 1 is a front view partly broken away of the dialing or selecting apparatus.

In the exemplary embodiment shown, provision is made for the generation of pulse representations of eight characters during each cycle of operation, and these pulses are repeatedly generated as long as the motor operates. Any arbitrarily chosen number of representations of characters (within reasonable limits) may be generated by properly designed signaling apparatus. A maximum of eight representations of characters was selected for this disclosure since eight-character calling numbers are in common use in telephone systems. It will be understood that these characters may be digits or letters or a combination of the two as commonly used in designating telephone calls. Each of the digits 0 to 9 will be represented by a different combination of two pulses; the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words, each transmitted pulse of approximately 1-millisecond duration is in effect lengthened to a decaying alternating current of approximately 3½-millisecond duration. At the end of this 3½-millisecond period or any time thereafter a second pulse may be transmitted.

The signaling system employed in this embodiment of the invention comprises a start pulse of about 1-millisecond duration for each character, the start pulses being generated at 12½-millisecond intervals as long as the motor is running, and a stop pulse of about 1-millisecond duration for each character, each stop pulse starting during the 4- to 8½-millisecond interval of time after the start of the start pulse. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which is initiated 4 milliseconds after the start pulse was initiated, digit 2 is represented by a start pulse followed by a stop pulse which is initiated 4½ milliseconds after the start pulse was initiated, and so on. It will be observed that the stop pulse for the digit 0 is initiated 8½ milliseconds after its start pulse and 4 milliseconds before the next succeeding start pulse. Thus, there is required an increment of time of 4 milliseconds for the generation and decay of the start pulse, nine increments of time of ½ millisecond each for the start of the generation of a pulse at any one of the ten times necessary to represent the various digits, and a last increment of time of 4 milliseconds, all of the latter being required to permit the stop pulse to decay only if it should occur at the end of the ninth increment of time. Consequently, 12½ milliseconds of time elapse between the start pulses of succeeding digits, from which it follows that 12½ milliseconds is required in this exemplary system to transmit each character designating the called number. In order to indicate the starting point of the transmission of a called number, a time interval of approximately 25 milliseconds is provided at the beginning of each pulse representation of a called number during which no pulses are transmitted. Thus, 125 milliseconds of time are required to transmit the no-signal period and the pulse representations of an eight-unit number.

As discussed hereinbefore, the apparatus disclosed by this invention comprises a pulse generator, a distributor synchronized with the pulse generator and a selector switch which interconnects the pulse generator to the distributor so that pulse representations of any eight-unit called number may be impressed across the telephone line.

Figure 3:
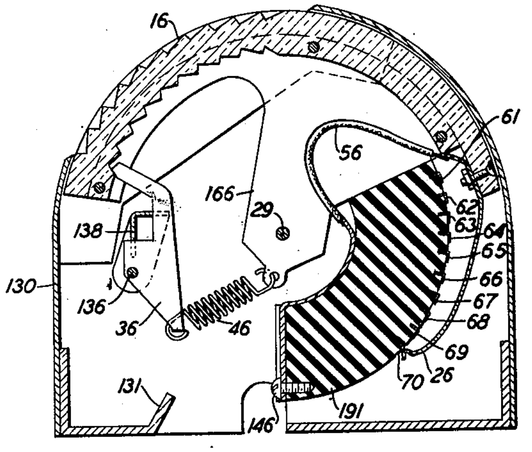
Fig. 3 shows a section taken along line 3—3 of Fig. 1.
Figure 2:
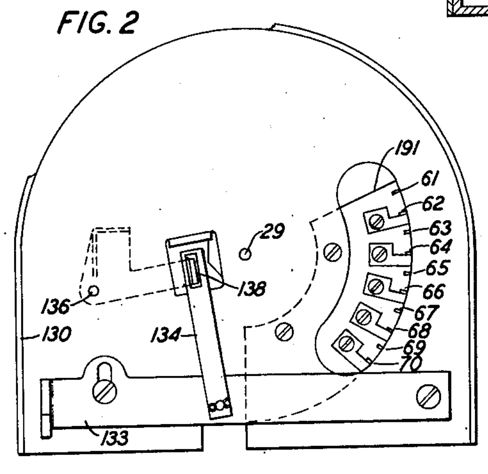
Fig. 2 is a side view of the same apparatus.

Figs. 1, 2 and 3 indicate one embodiment of the selector switch. It is enclosed in case 130, and selector dials 11 to 18 and release lever 133 are accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit a person's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations on the dials an operator can move the dial in either direction and so that the ratchet action of the pawl against the grooves secures the dial in any of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 135 is depressed, arm 138 is moved in a clockwise direction about shaft 136 and the detent pawls are disengaged from the dials, thereby permitting the spring associated with each dial to cause each dial to return to its initial position.

A spring contact is connected to each dial, and each dial and spring contact may be moved so that the spring contacts may be connected with any one of ten conductors. As indicated in Fig. 3, spring contact 26 is attached to dial 16 and it is electrically connected to terminal 146 through conductor 56. Insulator 191 supports the various terminals and conductors, and the ten conductors 61 to 70 which may be contacted by spring contacts 21 to 28 are mounted thereon.

Figure 4:
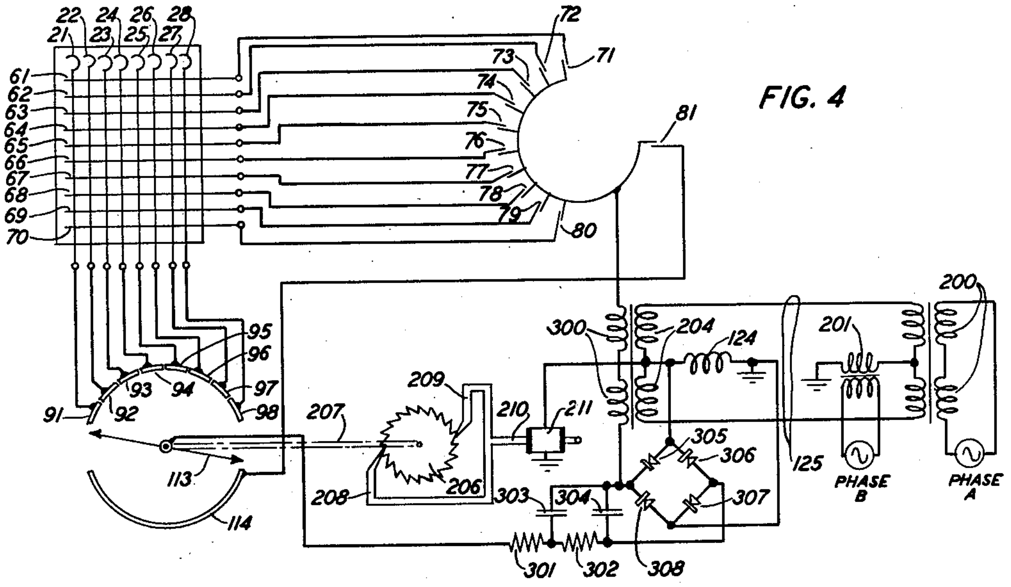
Fig. 4 shows the manner in which the finger wheels or dials, the slow-speed stepping mechanism, the high-speed stepping mechanism, the pulse forming condenser, and other apparatus are interconnected to cooperate one with another and with a telephone transmission line for generating and transmitting the desired pulses representing a called subscriber's designation.

The contact members 21 through 28 are connected to commutator segments 91 to 98 and conductors 61 to 70 are connected to reed switches 71 to 80 as indicated in Fig. 4 wherein selector switch 130 is indicated in schematic form.

In addition to the dials or manual selecting wheels and switches represented by 130 in Fig. 4, a slow-speed stepping mechanism is represented by brush arm 113, distributor segments 91 through 98, inclusive, and 114, ratchet wheel 206, and pulses 208 and 209 which are attached to armature 210 and actuated by the winding 211.

The fast contact or distributor mechanism is represented by contacts 71 through 81, inclusive. These are connected as shown in the drawing. The condensers 203 and 204 are provided for forming a pulse and are connected in a network including impedances 301 and 302. These condensers are charged from the alternating-current voltage across coil or winding 124 and ground. Rectifiers 305 through 308, inclusive, are provided to rectify this alternating-current voltage and charge condensers 303 and 304. The alternating current for the operation of the stepping magnet 211 and rectifiers 305 through 308 may be applied either locally or transmitted over the subscriber's line 125 from a distant point such as the central office.

Any suitable form of transmission circuits may be employed for transmitting the alternating current from the distant point over the subscriber's line. When desired, a single-phase alternating-current source may be applied to the subscriber's line by means of simplex circuits and apparatus, or the alternating current may be applied between the line conductors when so desired. As will be explained hereinafter it is desirable to have two-phase alternating current at the subscriber's station. When desirable the single-phase current may be applied to phase shifting networks at the subscriber's station for obtaining a two-phase supply of power.

However, as shown in the drawing in the exemplary embodiment set forth herein, one phase of the two-phase alternating current is applied between the loop conductors at the distant source of power and the second phase applied between both conductors and ground by means of simplex coils and apparatus. In this arrangement both phases are transmitted over the subscriber's lines without interfering one with another. It should be noted that the transformer 200 in addition to applying phase A to the subscriber's line, also acts as a simplex coil for applying phase B to the subscriber's line. In a similar manner, coils 204 of the fast stepping device are energized by one phase of the alternating current and these coils also serve for obtaining phase B from the transmission line. These coils or windings are wound on a core or stator for producing a rotating magnetic field as will be described hereinafter. The alternating current appearing across coil 124 is also applied to the rectifier arrangement for obtaining a substantially constant direct current for charging condensers 303 and 304.

Figure 5:
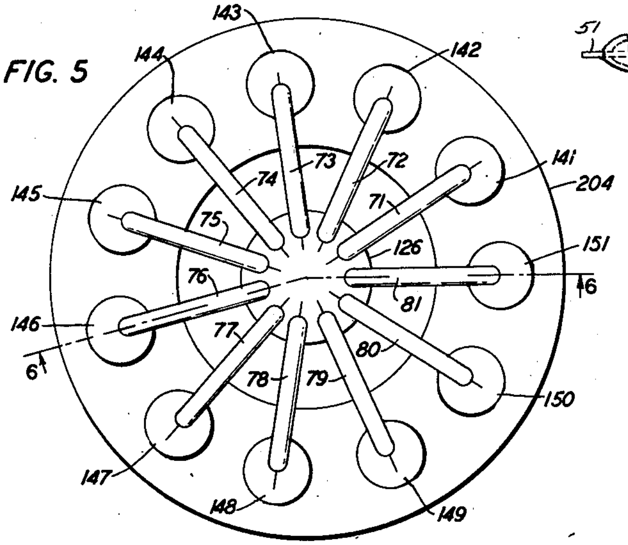
Fig. 5 shows a top view of a suitable fast stepping device.
Figure 5A:
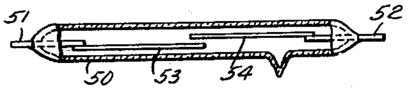
Fig. 5A shows details of a suitable type of contact device for use in the arrangement shown in Fig. 5.

A suitable form of the fast contact device is shown in Figs. 5 and 5A. Here a plurality of reed-type contact members, of the type disclosed in the following United States patents are employed: 2,245,391, Dickten, June 10, 1941; 2,264,622, Ellwood, November 25, 1941; and 2,289,830, Ellwood, July 14, 1942. Fig. 5 shows details of each of the contacts such as 71 through 81, inclusive. 50 represents a glass envelope through which are sealed conductors 51 and 52. A flat strip or reed-like member 53 is attached in electrical conductive relationship with and supported by the conductor 51 and reed member 54 is similarly attached to and supported by conductor 52. The reed members 53 and 54 are made of ferromagnetic material and when placed in a magnetic field of sufficient magnitude, these members will be drawn together and close an electric circuit between the conductors 51 and 52. The stiffness of the reed members 53 and 54 together with any suitable or desirable amount of preforming or pretensioning is such that the magnetic field in which these members are placed or applied thereto must be in excess of a predetermined magnitude before the members 53 and 54 will be attracted to each other with sufficient force to make an electrical contact between them. These contact devices are placed in a rotating magnetic field which field is developed due to the windings 204 and 124 applied to the core structure.

Figure 6A:
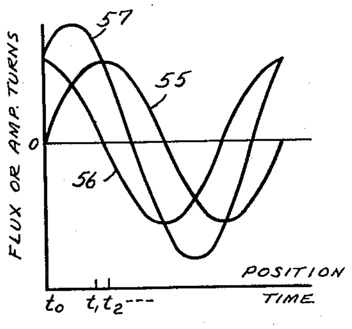
Fig. 6A shows curves illustrating the distribution of windings to produce the desired rotating megnetic field.
Figure 6:
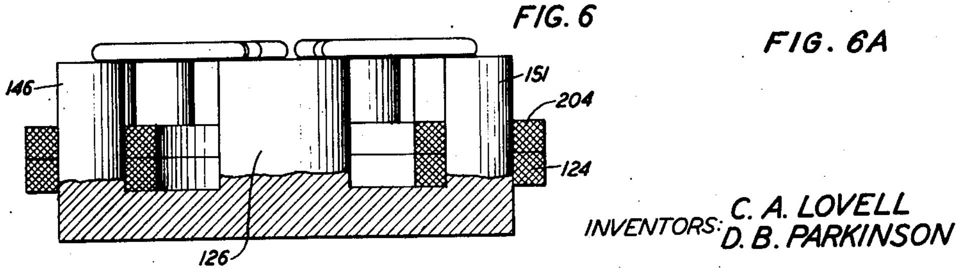
Fig. 6 shows a partial section front view of the same apparatus with the section taken along line 6—6 of Fig. 5.
Figure 7:
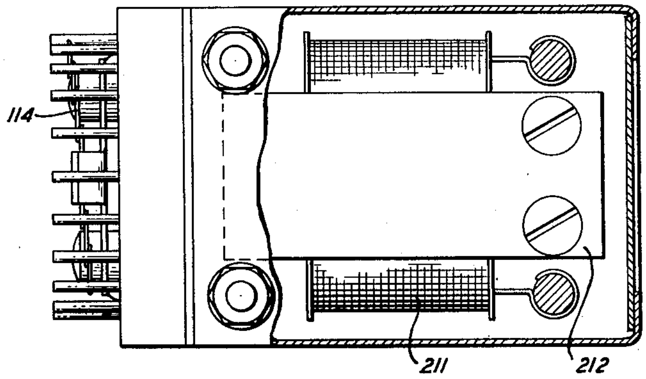
Fig. 7 is a top view partially broken away of a high-speed mechanism.
Figure 9:
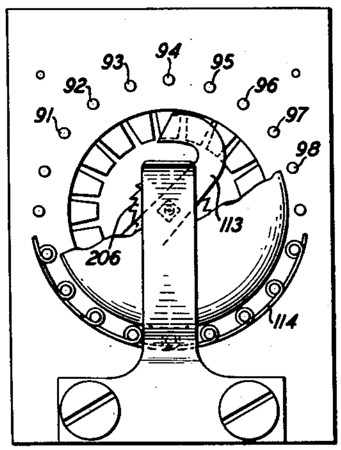
Fig. 9 is a front view partially broken away of the stepping mechanism.
Figure 8:
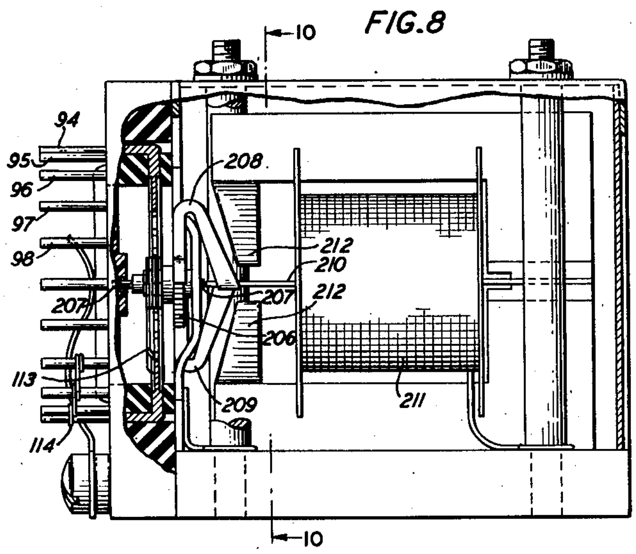
Fig. 8 is a side view partially broken away of the stepping mechanism.
Figure 10:
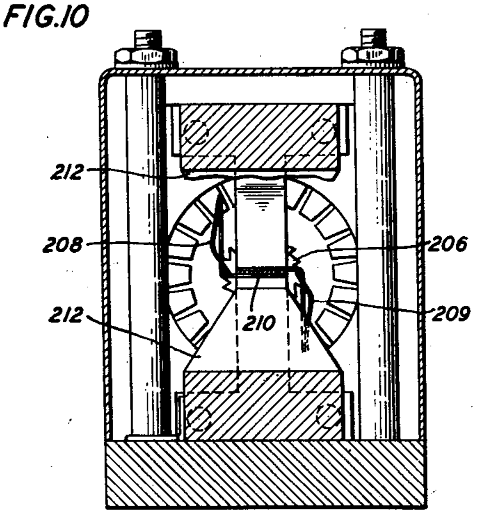
Fig. 10 shows a section partially broken away taken along line 8—8 of Fig. 6.
Figure 11:
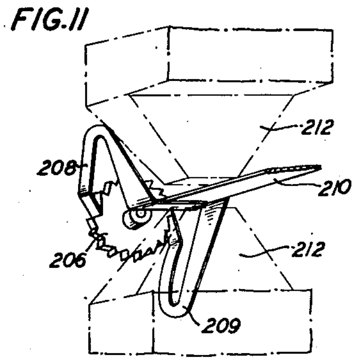
Fig. 11 is a partial disclosure of the stepping mechanism showing the pole-pieces, the armature and the stepping pawls and ratchet wheels.

When desired, the coils 204 and 124 as shown in Figs. 4, 5 and 6 may be employed to create a uniformly rotating or advancing magnetic field, and the contact members such as 71 through 81, inclusive, positioned within the rotating magnetic field having different angular positions, these angular positions being related to the time in which it is desired to have these contacts close. The contacts are arranged so that they will momentarily close only during a brief interval when the field in their direction is a maximum.

Difficulty is frequently encountered in such arrangements due to the fact that the magnetic structures of the contact devices 71 through 81, inclusive, distort the magnetic field so that it is no longer uniform or uniformly rotated. Consequently, the positioning of these contact devices in a magnetic field becomes very critical and unpredictable with the result that the contact members will have to all be individually adjusted to their proper angular positions within the magnetic field. In addition, these members are located in a magnetic field in air or free space, which fields are relatively weak and tend to cause the contact members to be slow and unreliable. In accordance with the present invention, the two windings are arranged on the magnetic core structure shown in Figs. 5 and 6 in such a manner that the flux is arranged to go through an armature at each one of the poles at a predetermined time. In this manner the closing of the reed-type contacts may be accurately controlled and in addition the members spaced more or less uniformly around a circular core structure, which structure has its pole-pieces substantially uniformly spaced around its periphery thus providing more room for windings in addition to rendering the time the contacts are operated substantially independent of the positions of these pole-pieces. As shown in Figs. 5 and 6, the corresponding contact members 71 through 81, inclusive, are bridged from a center pole-piece 126 to an individual pole-piece 141 through 151, inclusive. These contacts are provided with mechanical or other bias means so that they close only when the magnetic field through them is a maximum. Thus the contacts are actuated twice for each revolution of the rotating field and thus during each cycle of the applied alternating current. The contact members 53 and 54 may be pretensioned, i. e., mechanically biased sufficiently so that they will not be operated by any magnetic fields except the maximum value of the rotating magnetic field. However, due to the disposition of the windings about the various pole-pieces the contacts may be adjusted to be operated or closed at any specific time during a half cycle, which time may be accurately controlled by proper proportioning of the windings as pointed out above.

Figs. 7, 8, 9, 10 and 11 show one embodiment of a suitable type of stepping device or switch and distributor. The distributor comprises a double-ended brush arm 113 moving over contacts 91 through 98 and 114. The brush 113 is driven by ratchet wheel 206 both of which are mounted upon shaft 207. The ratchet wheel 206 is driven by stepping pawls 208 and 209 which are attached to a vibrating magnetic reed 210. The magnetic structure is polarized by permanent magnet 212 so the magnetic reed 210 vibrates vertically as viewed in Figs. 8, 9, 10 and 11 in response to alternating current flowing in the coil 211 surrounding the reed. When alternating current is applied to coil 211 the magnetic polarity of reed 210 is changed each half cycle of the alternating current so that the reed moves upward and downward during each cycle. Each time reed 210 moves upward or downward carrying pawls 208 or 209, ratchet wheel 206 is moved one step by each of the stepping pawls. Thus the ratchet wheel 206 and brush 113 are moved one step for each half cycle of the applied alternating current.

In the embodiment shown in Fig. 4, the alternating current for energizing the stepping magnet 211 is obtained from the voltage appearing across the winding 124. This current is in turn obtained from the phase connected between the conductors 125 of the subscriber's line and ground by means of a simplex circuit connection. As a result, the selector switch or slow-stepping distributor takes one step for each half cycle of the alternating current. When desired, the tuning of the magnetic reed 210 may be adjusted so that the stepping magnet advances the ratchet wheel 206 immediately preceding the generation of a start pulse by closure of the reed contacts 81. Thus the switch is not stepped at a time which would interfere with the proper generation of the pulses relating to each of the digits or symbols representing the subscriber's number.

Of course, the time of advancing of the ratchet wheel 206 may be adjusted either before or after the start pulse so long as the switch does not advance during any of the pulses and if compensating adjustments are made at the receiving end of the subscriber's line 125, which is usually located in a central office. When desired, the various times of advancing or stepping of the stepping switch relative to the time other equipment is actuated may be adjusted by means of electrical networks instead of mechanical adjustments on the reed and stepping pawls.

In operating the subscriber's station set, the subscriber will position the dials or finger wheels 11 through 18 and thus the spring or contact devices 21 through 28 in accordance with the number or other designation in the called subscriber's station. As a result, the contact members 21 through 28 will make contact with the selected ones of the bus-bars 61 through 70, inclusive, which extend to the magnetic type reed contact devices 71 through 80, inclusive.

After the subscriber has thus set his station equipment, he will initiate a call which, in turn, sets apparatus in the central station into operation in a well-known manner, the result of which will be the application of alternating current to the subscriber's line either at the central station or elsewhere and, as pointed out hereinbefore in the exemplary embodiment set forth herein, phase A of a two-phase source is connected through transformer 200 to the subscriber's loop circuit extending through the subscriber's station and phase B is connected to both conductors and ground in a simplex circuit arrangement. Phase B causes the control magnet 211 of the stepping device to be actuated and advance the ratchet wheel 206 one step for each half cycle of the applied alternating current. As a result, the brush arm 113 also advances one position for each half cycle of the applied alternating current.

Windings 204 and 124 are arranged to form a two-pole motor winding which will cause a two-pole magnetic field to rotate within these windings. The manner of applying polyphase windings to a core stator or armature to produce a rotating magnetic field is well understood. For example, see chapter 9 entitled "Magnetic Field in Induction Motors. Polyphase Motors," beginning on page 121 of a book entitled "Alternating Current Motors" by McAllister, published by McGraw Publishing Company, 1907.

Briefly, as set forth in chapter 9 of the above-identified book, polyphase windings may be applied to a ring-type core structure to produce a rotating magnetic field across the ring which is substantially constant in magnitude and rotates the synchronism with the applied alternating current. Where it is desired to cause the field to rotate uniformly the respective phase windings are distributed around the ring in a suitable manner as set forth in the above publication as well as many other places in the prior art. Such distribution is illustrated in Fig. 6A wherein curve 55 represents the flux or ampere turns of magnetomotive force at various positions around the ring produced by one of the phase windings and curve 56 represents a flux, ampere turns, or magnetomotive force produced by the other winding as a function of the position around the core structure. Curve 57 shows the combined flux pattern around the core structure as the result of current flowing through the two phase windings. In drawing the curves of Fig. 6A it is assumed that the polyphase currents of the two phases are substantially sinusoidal in wave form and that it is desired to produce a uniform magnetic field which continuously progresses and rotates around the field or core structure. It is also assumed that the space distribution of the flux produced by each of the phase windings as well as the total flux produced by both of these windings is sinusoidal in wave form. The flux or ampere turn patterns shown in Fig. 6A occur for only a brief instant during each cycle of the applied alternating current. However, the total flux represented by curve 57 remains substantially constant in amplitude and moves successively around the core structure. As a result, the abscissa of the curves of Fig. 6A may also be considered to represent time as well as the space distribution of the windings so that the positions along the abscissa may be employed to indicate the places or positions around the field at which it is desired to place the contact members. An initial time is assumed such as $t_0$. Then the other contacts are likewise positioned at $t_1$, $t_2$, etc., when it is desired to have these contacts close at the respective times $t_1$, $t_2$, etc. If the contacts shown in Fig. 5A are placed on the core structure shown in Figs. 5 and 6 in positions corresponding to the positions indicated by $t_0$, $t_1$, $t_2$, etc., assuming that the windings are such as to produce a uniformly progressing magnetic field, then the contacts will be closed at the desired times $t_0$, $t_1$, $t_2$, etc. If, however, it is desired to uniformly position the contacts as shown in Fig. 5, then the relative ampere turns or flux at each one of the positions or times $t_0$, $t_1$, $t_2$, etc. for each of the phases may be determined from the curves or from the data represented by the curves and a corresponding number of ampere turns applied to each of the core sections 141 through 151, inclusive.

In the exemplary embodiment set forth herein the windings 124 and 204 are applied to the circular core, shown in Figs. 5 and 6, in such a way that a magnetic field is caused to rotate around the pole-pieces 141 through 151, inclusive. As a result, the contact members 71 through 81, inclusive, are successively closed twice during each revolution of the magnetic field and thus once during each half cycle. In other words, all these contacts close in succession during each half cycle of the applied alternating current.

The application of the phase B in the alternating current to the simplex circuit also applies alternating current to the rectifiers 305 through 308, which rectifiers cause condensers 303 and 304 to have their potential, and thus their charge, changed and restored to an initial or reference voltage condition.

Assume for purposes of illustration that upon the application of the alternating current to the subscriber's line 125 brush arm 113 will advance one step from the position shown in the drawing. Due to the adjustments of the stepping device and the rotating magnetic field within the core structure, shown in Figs. 5 and 6, immediately after the brush arm 113 is advanced, contacts 81, in closing, complete a circuit from the upper terminal of condensers 303 and 304 through the windings 300, contacts 81, step switch or distributor segment 114, distributor brush 113, and circuit elements 301 and 302 to the lower terminals of the respective condensers 303 and 304. Closure of the above-described circuit causes an abrupt change in the potential and thus the charge on the condensers 303 and 304 with the result that a start surge of current flows through the above-described circuit including the windings 300. The windings 300 are also arranged upon the core structure shown in Figs. 5 and 6, which core structure thus acts as a transformer and repeats the start pulse applied to windings 300 in windings 304. The pulse is then transmitted over the line 125 to the distant central office where it may be employed to control switching devices.

Each one of the contacts 71 through 81, inclusive, is, of course, successively closed during each half cycle of the applied alternating current as described above; however, only one of these contacts completes a circuit during this half cycle to generate a stop pulse in accordance with the setting of the manual selecting device or dialing device 130. As a result, a circuit from the lower terminals of condensers 303 and 304 through the impedance devices 301 and 302, which condensers and impedances provide a pulse-forming or pulse-shaping network, is completed through one of the contacts 71 through 80 depending upon the position of the contact lever 21 to the other terminal of condensers 303 and 304. Assuming for purposes of illustration that this contact lever is in contact with bus-bar 63, then upon closure of contacts 73 a circuit is completed for abruptly changing the charge on condensers 303 and 304 which in turn causes a stop pulse to be transmitted to the line 125.

At the beginning of the next half cycle of alternating current from phase B for example, the control magnet 211 of a stepping switch will be actuated to advance the ratchet wheel 206 one step and thus advance the brush arm 113 one step. As a result, the contact 22 is now connected to the impedance 301 and, as a result, during this next half cycle the charge on condensers 303 and 304 is abruptly changed twice and corresponding pulses start and stop transmitted to the central station.

The above-described mode of operation then continues for the transmission of all the information at the switching station in which two pulses are transmitted representing each character or digit of a called subscriber's number or station designation. The above cycles of operation are repeated so long as power is applied to the system.

After eight digits have been transmitted, the brush arm 113 passes off the segment 98 and also off the segment 114 and remains off of all the segments for one complete cycle or two half cycles of the applied alternating current. During this entire interval, contacts 71 through 81, inclusive, close in succession in the manner described above. However, the closure of these contacts is ineffective at this time due to the fact that the circuit of these contacts is open at the distributor segments 114 and 91 through 98. At the end of this silent interval or pause, the above-described operations are repeated during which two pulses representing each of the digits or symbols of a called subscriber's station are transmitted.

When it is desired to interrupt the operation of the equipment, the source of alternating current is removed from the line and other switching equipment actuated to establish a path to the called subscriber's station.

What is claimed is:

1. In combination in a telephone calling system, an impulse generator comprising means for producing a rotating magnetic field, a plurality of reed contact devices angularly disposed in said field, a condenser, connections between said condenser and said contacts for discharging said condenser during each rotation of said magnetic field, a subscriber's line, means responsive to each of said condenser discharges for transmitting a signaling pulse over said line, a plurality of manually controlled contacts for selecting said reed contacts for each half rotation of said magnetic field, a stepping distributor for successively completing circuits to said manually controlled contacts, means for stepping said distributor two steps for each rotation of said rotating magnetic field.

2. In combination in a telephone system, a calling arrangement comprising a calling line, a first distributor device comprising a stator structure, a plurality of polyphase alternating-current windings interlinking said stator structure, connections from said line for applying polyphase alternating current to the windings of said distributor device for creating a rotating magnetic field within said stator, a plurality of reed contact devices angularly located in said field and actuated successively by said rotating field, manually controllable selecting device for selecting certain of said reed contact devices, a second distributor, an electromagnet for advancing said second distributor in steps, means for actuating said electromagnet in synchronism with said rotating field, connections between said reed contacts and said manually controlled selecting device and said second distributor for completing a circuit through one of said reed contacts during each half cycle of one of the phases of said polyphase alternating current.

CLARENCE A. LOVELL.
DAVID B. PARKINSON.

REFERENCES CITED

The following references are of record in the file of this patent:

UNITED STATES PATENTS

| Number | Name | Date |
|---|---|---|
| 1,458,180 | Hammond | June 12, 1923 |
| 2,499,606 | Parkinson | Mar. 7, 1950 |